US011982861B2

(12) United States Patent
Brooker et al.

(10) Patent No.: US 11,982,861 B2
(45) Date of Patent: May 14, 2024

(54) PRE-ALIGNED OPTICAL MOUNTS

(71) Applicant: Thorlabs, Inc., Newton, NJ (US)

(72) Inventors: Jeffrey S. Brooker, Centreville, VA (US); Shane Patton, Bunker Hill, WV (US); Brian Mehl, Sterling, VA (US); Eric Lieser, Boyce, VA (US)

(73) Assignee: Thorlabs, Inc., Newton, NJ (US)

( * ) Notice: Subject to any disclaimer, the term of this patent is extended or adjusted under 35 U.S.C. 154(b) by 675 days.

(21) Appl. No.: 16/662,807

(22) Filed: Oct. 24, 2019

(65) Prior Publication Data

US 2020/0132959 A1 Apr. 30, 2020

Related U.S. Application Data

(60) Provisional application No. 62/751,257, filed on Oct. 26, 2018.

(51) Int. Cl.
*G02B 7/02* (2021.01)
*B23C 3/16* (2006.01)

(52) U.S. Cl.
CPC .............. *G02B 7/023* (2013.01); *B23C 3/16* (2013.01); *B23C 2215/40* (2013.01)

(58) Field of Classification Search
CPC ........ G02B 27/62; G02B 7/004; G02B 7/023; G02B 7/1822
See application file for complete search history.

(56) References Cited

U.S. PATENT DOCUMENTS

| 5,194,993 | A  | * | 3/1993 | Bedzyk | G02B 7/023 |
|           |    |   |        |        | 359/813    |
| 6,266,196 | B1 | * | 7/2001 | Do     | G02B 7/023 |
|           |    |   |        |        | 359/813    |
| 6,547,402 | B2 | * | 4/2003 | Masuda | G02B 7/10  |
|           |    |   |        |        | 353/100    |
| 7,369,334 | B2 |   | 5/2008 | Case et al. | |
| 8,313,608 | B2 |   | 11/2012 | Garris et al. | |
| 2005/0068642 | A1 |   | 3/2005 | Harada et al. | |
| 2009/0266967 | A1 | * | 10/2009 | Allen | G02B 7/006 |
|           |    |   |        |        | 248/512    |

(Continued)

FOREIGN PATENT DOCUMENTS

| CN | 1646960 A | | 7/2005 |
| KR | 1384539 B1 | * | 4/2014 |

OTHER PUBLICATIONS

European Search Report with European search opinion issued by The European Patent Office for European Patent Application No. 19877358.2, dated Jul. 8, 2022.

(Continued)

*Primary Examiner* — Ephrem Z Mebrahtu
(74) *Attorney, Agent, or Firm* — Myers Wolin, LLC

(57) ABSTRACT

A method of making a pre-aligned optical mount, including: mounting a desired optical element onto a housing; securing the housing onto a stage having at least four degrees of freedom; aligning the optical element with a specified optical axis by adjustment of the stage; machining the housing to match an optical platform onto which the housing is be mounted; wherein the housing is machined such that an optical axis of the optical element is aligned with a pre-defined optical axis with respect to the optical platform when the housing is mounted onto the optical platform.

7 Claims, 9 Drawing Sheets

(56) References Cited

U.S. PATENT DOCUMENTS

2011/0102893 A1* 5/2011 Solyar ................... G02B 7/004
 359/503
2019/0310441 A1* 10/2019 Suchowski ............. G02B 7/18
2020/0064580 A1 2/2020 Foes et al.

OTHER PUBLICATIONS

International Search Report issued for corresponding International Patent Application No. PCT/US2019/057864, dated Feb. 6, 2020.
First Office Action issued by the China National Intellectual Property Administration for Chinese Patent Application No. 2019800706735, dated Nov. 22, 2022, with English translation attached.

* cited by examiner

PRE-ALIGNED OPTICAL MOUNTS

CROSS REFERENCES TO RELATED APPLICATIONS

This application claims the benefit of U.S. Provisional Patent Application No. 62/751,257 filed on Oct. 26, 2018. The disclosure and entire teachings of U.S. Provisional Patent Application 62/751,257 are hereby incorporated by reference.

FIELD OF THE INVENTION

This invention generally relates to optical mounts. More particularly, the invention relates to pre-aligned optical mounts.

BACKGROUND

In optical systems, the alignment of each component must be very precise. Typically, alignment of each component is made in order to make sure that the components are centered and normal with respect to an optical axis. However, performing the alignment is a very time consuming, and it usually involves center adjustments as well as tip/tilt adjustments with alignment optics. Furthermore, in some optical systems, the components are placed in a very tight space, making the alignment process very difficult.

Therefore, there is a need for optical components that are pre-aligned so that no further alignment is necessary when these optical components are installed into an optical system setup.

SUMMARY

An embodiment of the present disclosure provides a method of making a pre-aligned optical mount, including: mounting a desired optical element onto a housing; securing the housing onto a stage having at least four degrees of freedom; aligning the optical element with a specified optical axis by adjustment of the stage; machining the housing to match an optical platform onto which the housing is be mounted; wherein the housing is machined such that an optical axis of the optical element is aligned with a predefined optical axis with respect to the optical platform when the housing is mounted onto the optical platform.

Another embodiment of the present disclosure provides a pre-aligned optical mount including a housing configured for mounting onto an optical platform, and an optical element mounted onto the housing; wherein the housing is machined such that an optical axis of the optical element is aligned with a predefined optical axis with respect to the optical platform when the housing is mounted onto optical platform.

Another embodiment of the present disclosure provides a pre-aligned optical kit including: a plurality of pre-aligned optical mounts; and an optical table; wherein each pre-aligned optical mount includes: a housing; and a specific optical element mounted onto the housing; wherein the housing includes: a contact surface on the housing; and a first and second holes on the contact surface; wherein the contact surface is machined with respect to a desired plane, and the first and second holes are positioned and sized to fit the corresponding first and second locating pins on the optical table; wherein when the contact surfaces of the plurality of pre-aligned optical mounts make contact with the optical table with their respective locating pins inserted, optical axes of the plurality of the optical elements are aligned with the corresponding predefined optical axes with respect to the optical table, and a desired optical path is aligned with the optical axes of the plurality of the optical elements.

Another embodiment of the present disclosure provides a CNC milling machine; a stage having at least four degrees of freedom configured to securely support the housing; a light source configured to generate a light beam; a beam splitter configured to transmit the light beam onto the optical element and to reflect light from the optical element onto a first detector; a second detector configured to detect light transmitted by the optical element; a processor configured to align the optical element with a specified optical axis by sending adjustment commands to the stage based on the signal detector by the first and second detectors; the processor is further configured to control the CNC milling machine to mill the housing to match an optical platform onto which the housing is be mounted; wherein the housing is milled such that an optical axis of the optical element is aligned with a predefined optical axis with respect to the optical platform when the housing is mounted onto the optical platform.

DETAILED DESCRIPTION OF THE PREFERRED EMBODIMENTS

Figure 1:
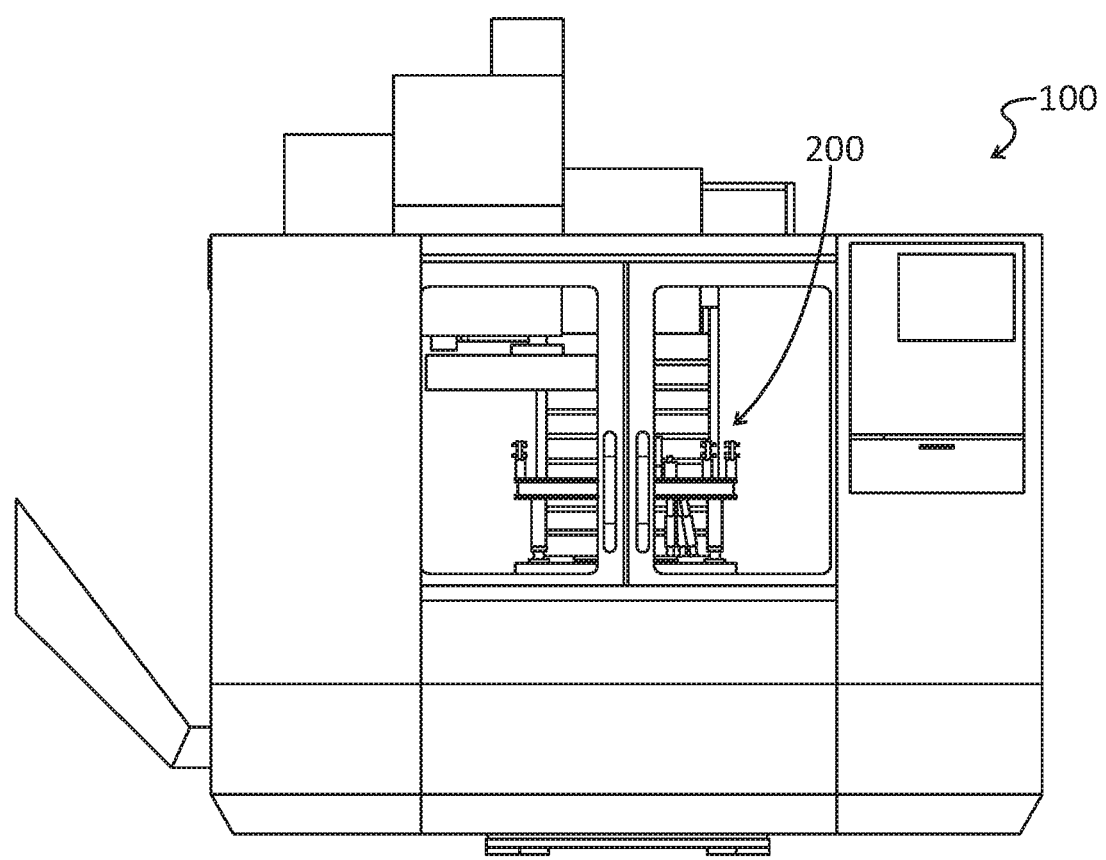
FIG. 1 shows an optical setup placed in a CNC milling machine according to an embodiment of the invention.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached,"

"affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 2:
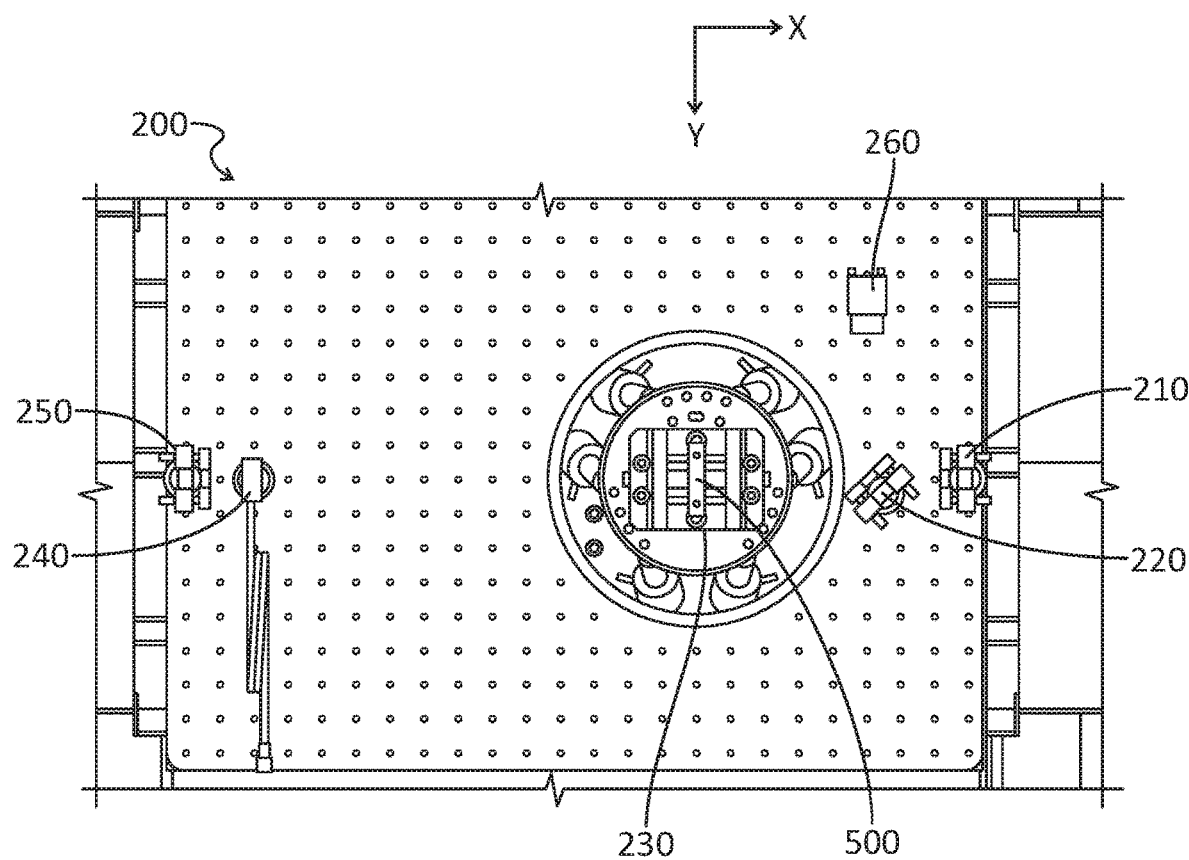
FIG. 2 is a top view of an optical setup according to an embodiment of the invention.
Figure 3:
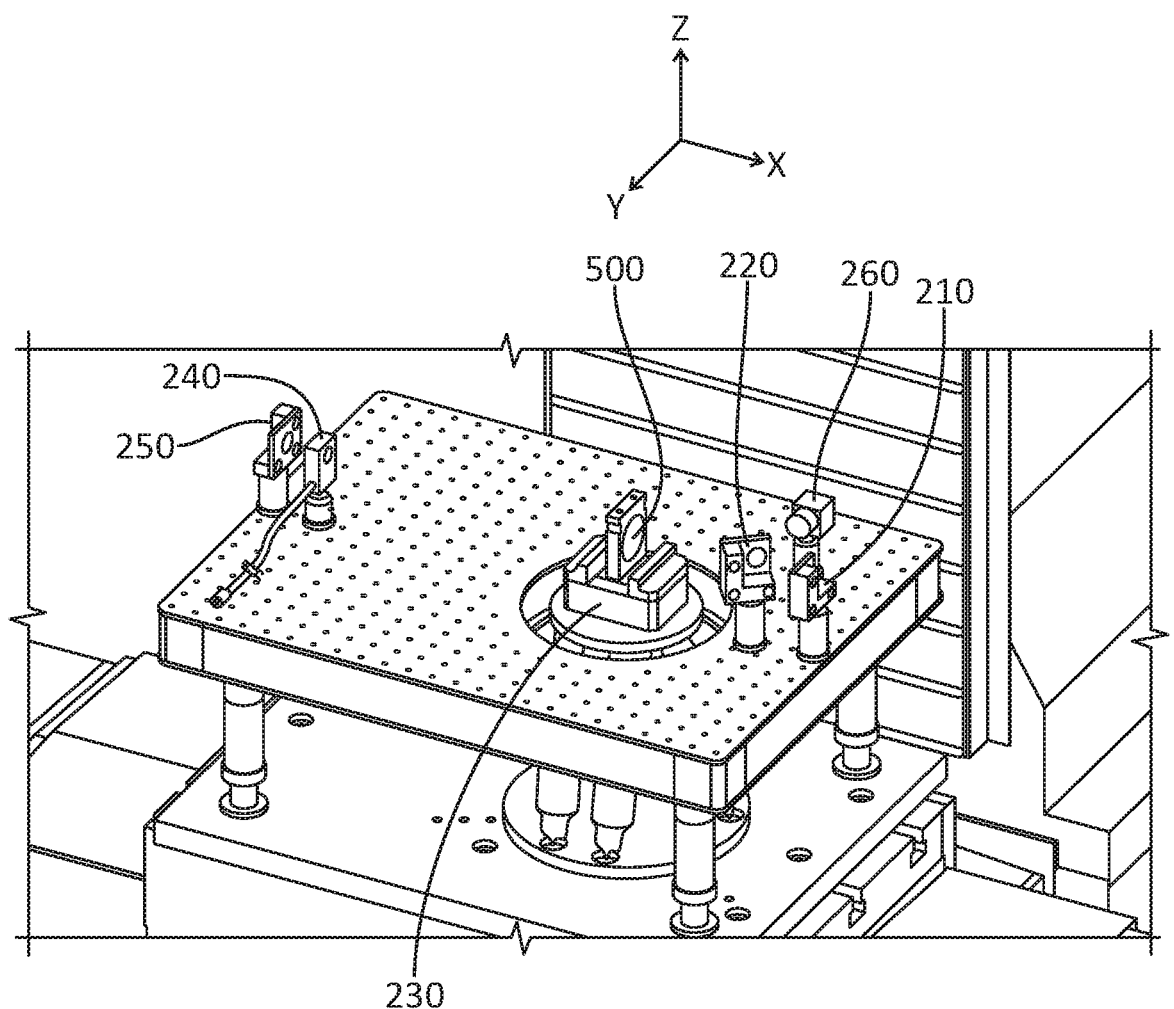
FIG. 3 is a perspective view of an optical setup according to an embodiment of the invention.
Figure 4:
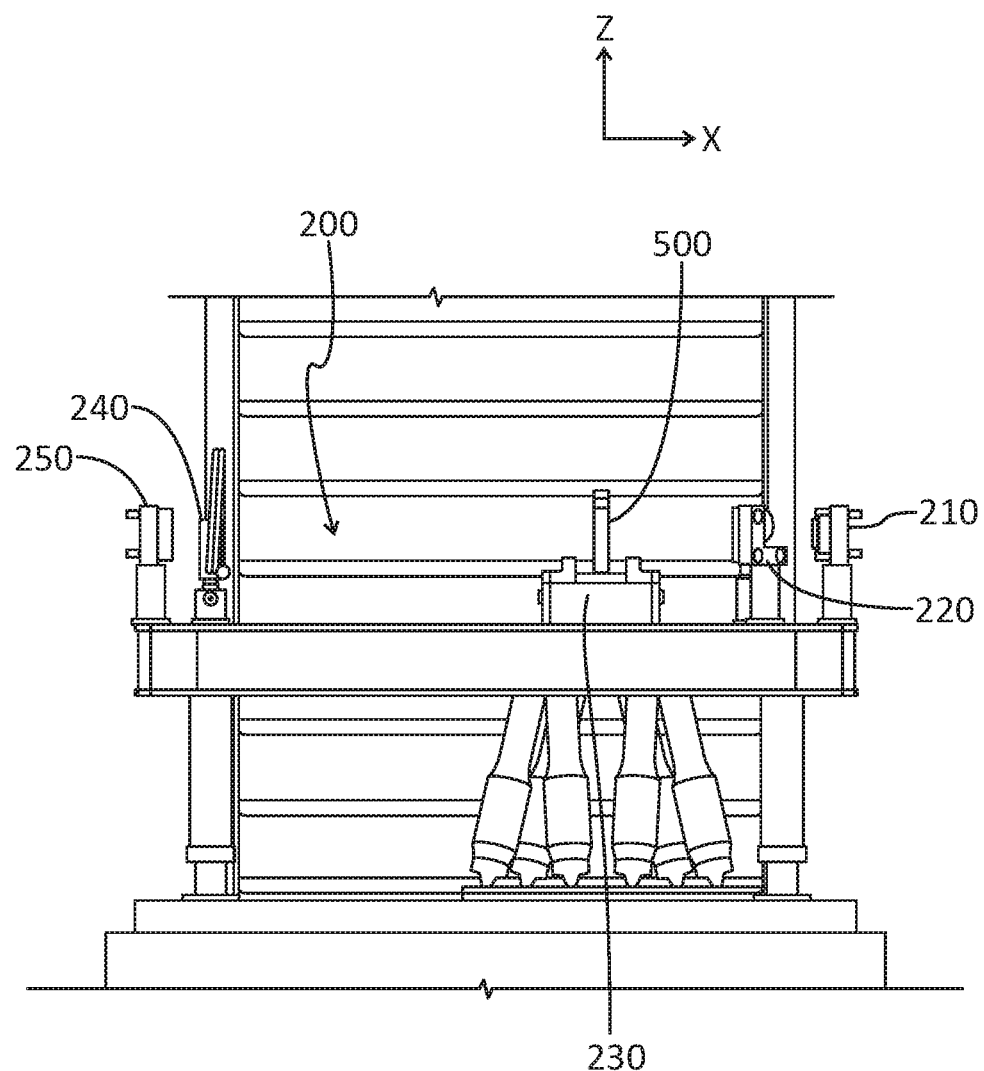
FIG. 4 is a front view of an optical setup according to an embodiment of the invention.
Figure 5:
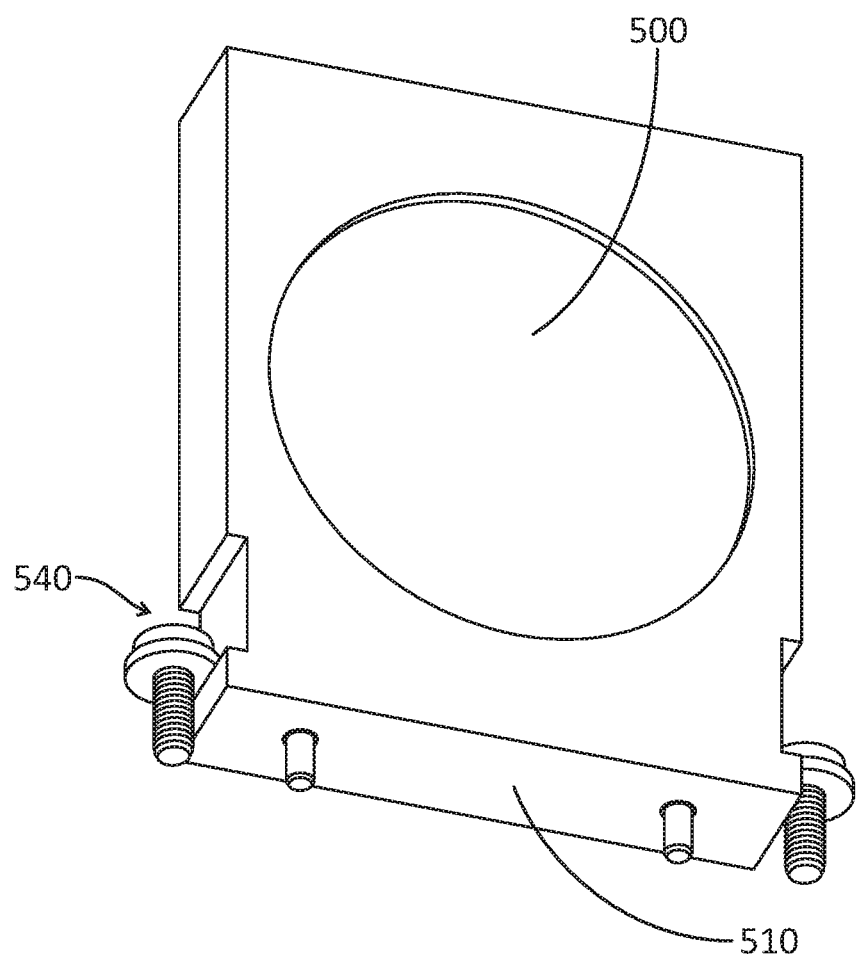
FIG. 5 is a perspective view of a pre-aligned optical mount according to an embodiment of the invention.

FIG. 1 shows an optical setup 200 placed in a computer numerical control (CNC) milling machine 100 according to an embodiment. Note that any optical element, such as a lens, mirror, prism, grating, etc., may be used. For illustration purposes, a lens will be used as an example. The lens is mounted in a housing of the optical mount. The optical mount includes a machinable part such that materials may be removed to create a contact surface that is parallel to a reference plane and the optical axis of the optical element is at a desired height. A processor 300 controls the operation of the CNC milling machine. FIGS. 2-4 illustrate an optical setup 200 in different views according to an embodiment. A single mode fiber laser 210 passes through a plate beam splitter 220 to a lens. As shown in FIG. 5, the lens 500 is the desired part to be aligned with an optical table, and the contact surface 510 is machined to a predefined optical axis height and centered by means of two precision locating pins and holes. Also shown in FIG. 5 are slots 540 for securing the mount onto an optical table via a bracket, bolts, etc.

For ease of discussions, an X-Y-Z reference frame is used. The optical mount with the lens 500 is held in by a vice attached to a stage 230 having at least four degrees of freedom, for example, a hexapod, is translated in the Z- and Y-directions until the transmitted beam on a detector 240, for example, a 2D lateral sensor, is overlaid with its home position. Additionally, the stage's pitch and yaw are adjusted until the fringe pattern reflected by a mirror 250 is overlaid with its home position upon a detector 260, for example, a CMOS camera. The alignment of the lens by means of the stage is done in an iterative fashion by the processor 300 until an acceptable alignment is achieved.

After alignment, the at least four is locked into place such that the part can be faced milled to the proper height and locating pin holes spotted, drilled and/or reamed, based on the optical axis/path requirements of the optical platform onto which the optical mount is to be installed. For example, if the optical mount is to be installed onto an optical table and it is required that the optical axis is to be in a plane of height h above the optical table, centered between two locating pins of a distance d apart inserted into the optical table, each locating pin having a radius r. The mount will be milled to form a contact surface having a plane parallel to the aligned optical axis offset by the height h, and two holes of distance d/2 normal to the aligned optical axis are drilled on the contact surface, each hole having a radius r. It is understood that for other mounting features in the optical platform (e.g., slots, channels, rods, etc.), corresponding matching surface features in the pre-aligned optical mount can be milled to be the proper dimensions and shapes accordingly based on simple geometry.

In one embodiment, the stage is locked in place by a clamp, e.g., a pneumatic clamp or piezo-actuated clamp. While the tools are optically calibrated such that they are "zeroed" to the laser beam in both the Y-axis and Z-axis. The X-axis is zeroed by using a touch probe to touch off the face of the lens. A similar method can also be used for aligning mirrors or other optical elements. The laser is optically aligned to the motion of the table along the X-axis.

In one embodiment, during the milling and drilling, the detector signals are monitored to ensure that the alignment is not disturbed by the milling tools. A processor may utilize the signal from the detectors to manipulate the stage. In one embodiment, a feedback loop is used to provide continuous lateral and/or angle information to the processor to maintain the proper alignment during the milling process.

Note that the above method and system may be applicable for other optical mounts, e.g., kinematic mounts, translational mounts. Furthermore, the pre-alignment is not limited to a single plane. That is, embodiments of the present invention may provide pre-aligned optical elements in optical setups that include light paths in the X-, Y- and Z-directions.

Figure 6:
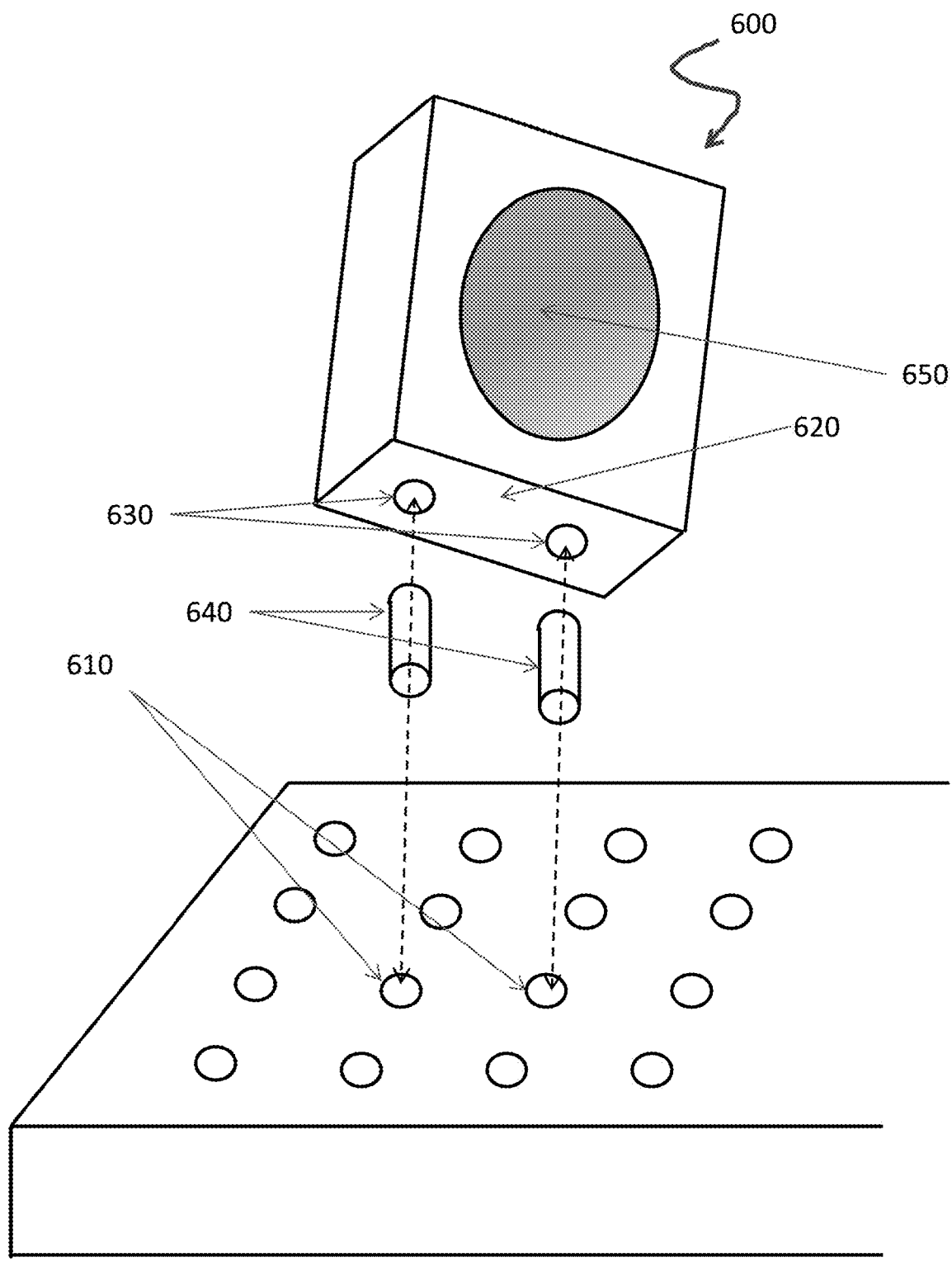
FIG. 6 is a pre-aligned optical mount according to an embodiment of the invention.

In one embodiment, as shown in FIG. 6, the optical element 650 in the pre-aligned optical mount 600 is to be aligned with an optical table, and the contact surface 620 is machined to a predefined optical axis height and centered by means of two precision locating pins 640 and holes 630 that correspond to the two holes 610 in the optical table. When the contact surface makes contact with the optical table with the first and second locating pins 640 inserted into the first and second holes respectively 610, 630, the optical axis of the optical element 650 is aligned with the predefined optical axis with respect to the optical table.

Figure 7:
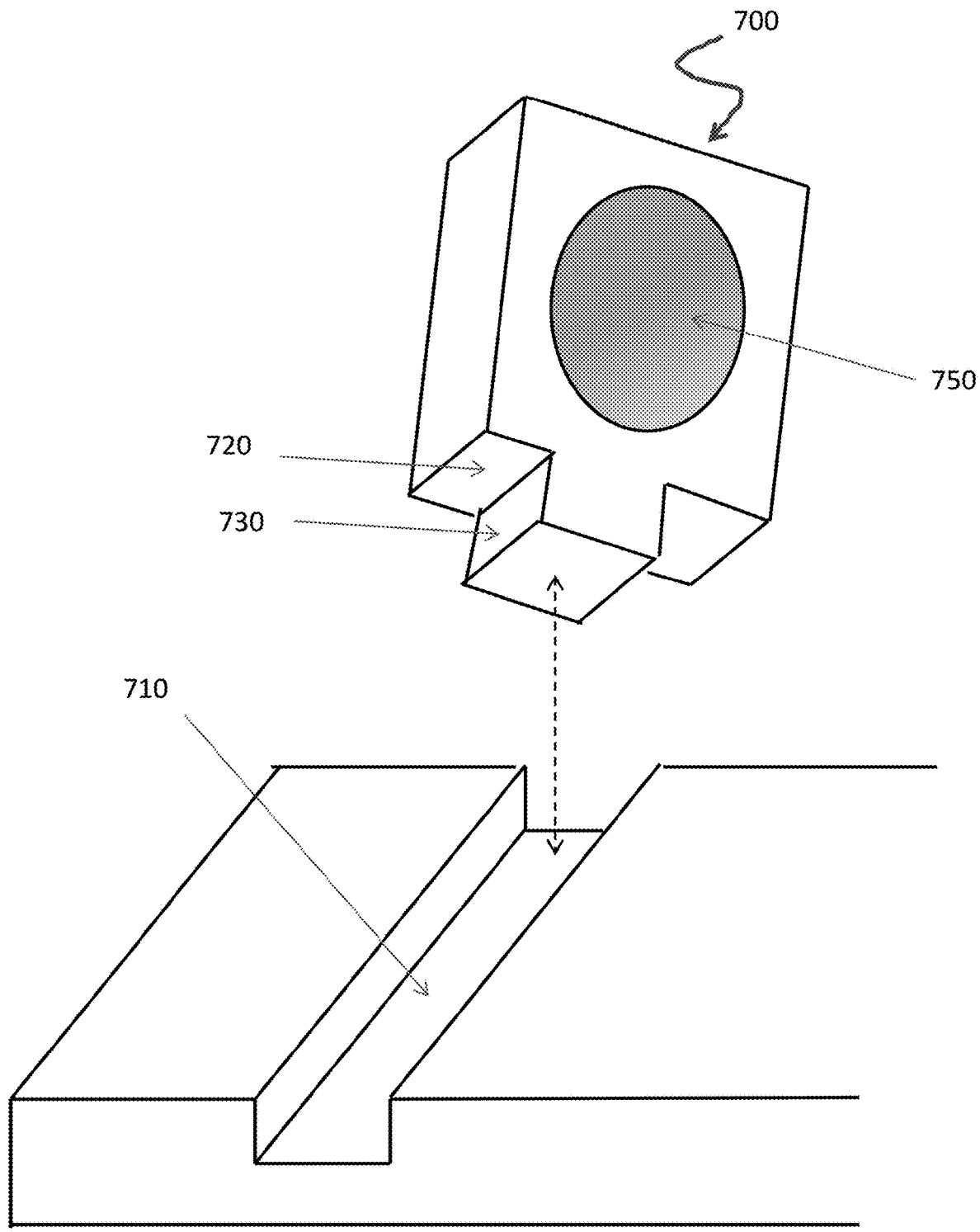
FIG. 7 is a pre-aligned optical mount according to an embodiment of the invention.

In another embodiment, as shown in FIG. 7, instead of locating pins and holes, the desired part 700 may be machined to have a square or rectangular boss 730 at the bottom of the contact surface 720 and the optical table is made with a matching square channel 710 in it, so that the optical element can slide along the channel while maintaining the alignment with the optical axis. When the contact surface makes contact with the optical table with the protrusion slid into the channel of the optical table, the optical axis of the optical element 750 is aligned with the predefined optical axis with respect to the optical table. As the pre-aligned optical mount slides along the channel, the optical axis of the optical element remains in an optical plane.

Figure 8:
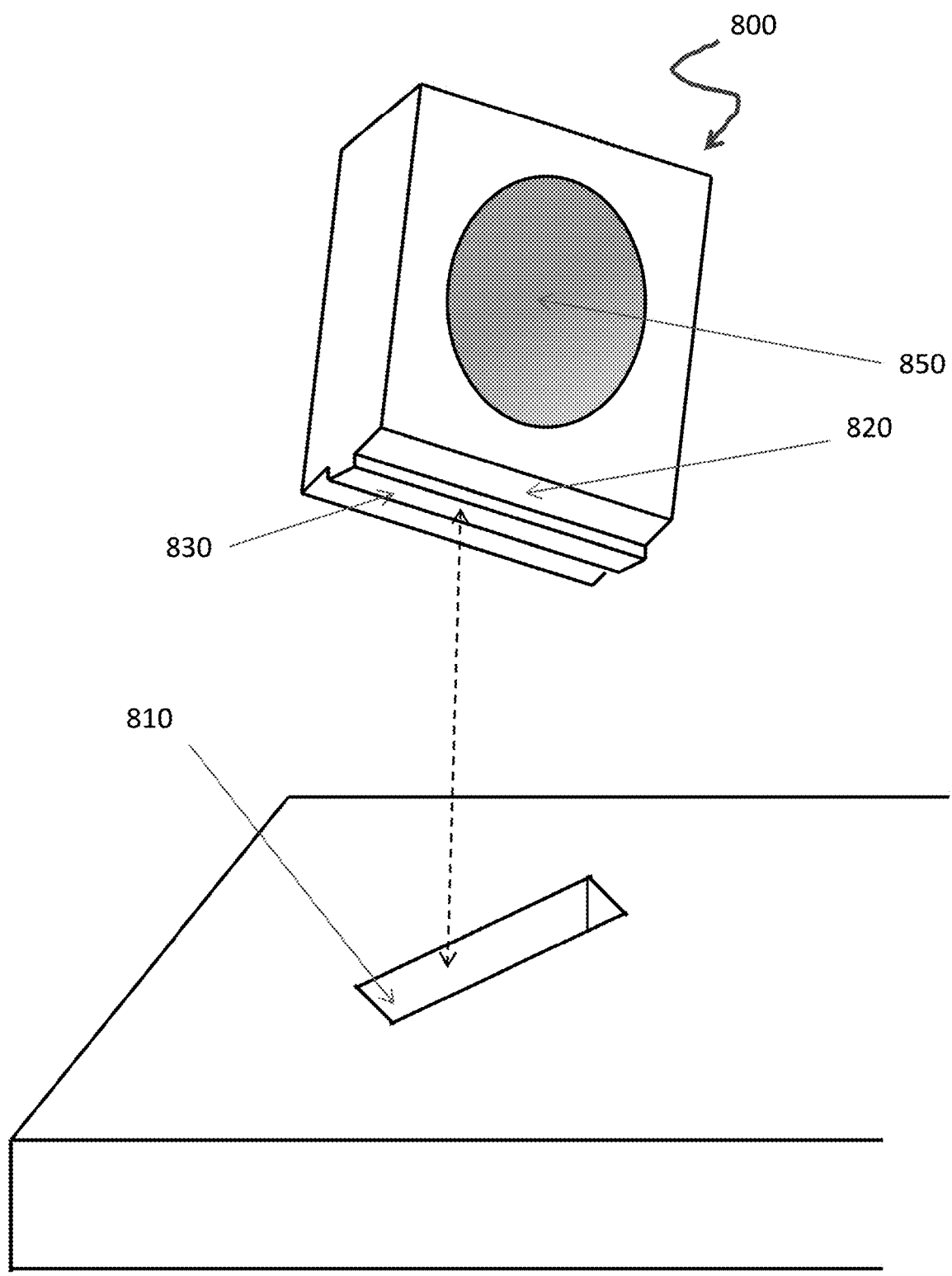
FIG. 8 is a pre-aligned optical mount according to an embodiment of the invention.

In another embodiment, as shown in FIG. 8, the desired part 800 may be machined to have a protrusion 830 at the bottom of the contact surface 820 and the optical table is made with a matching slot 810 in it. The protrusion may be inserted into the slot in a specified orientation, so that the optical element 850 is aligned with the optical axis when the protrusion is inserted into the slot.

Figure 9:
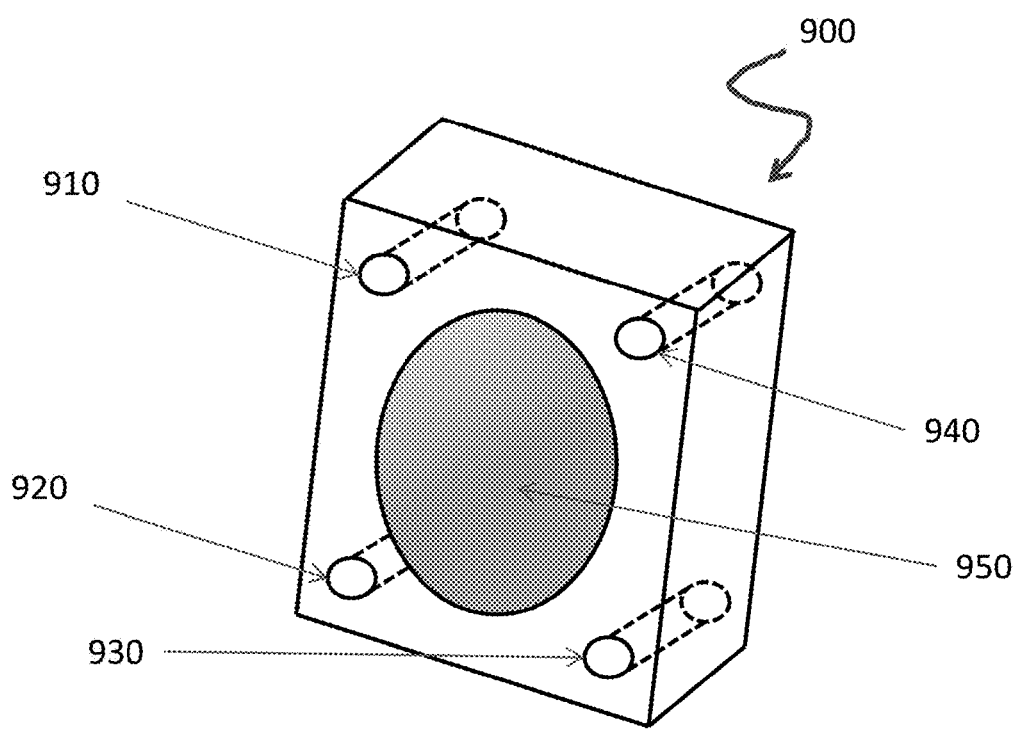
FIG. 9 is a pre-aligned optical mount according to an embodiment of the invention.
Figure 10:
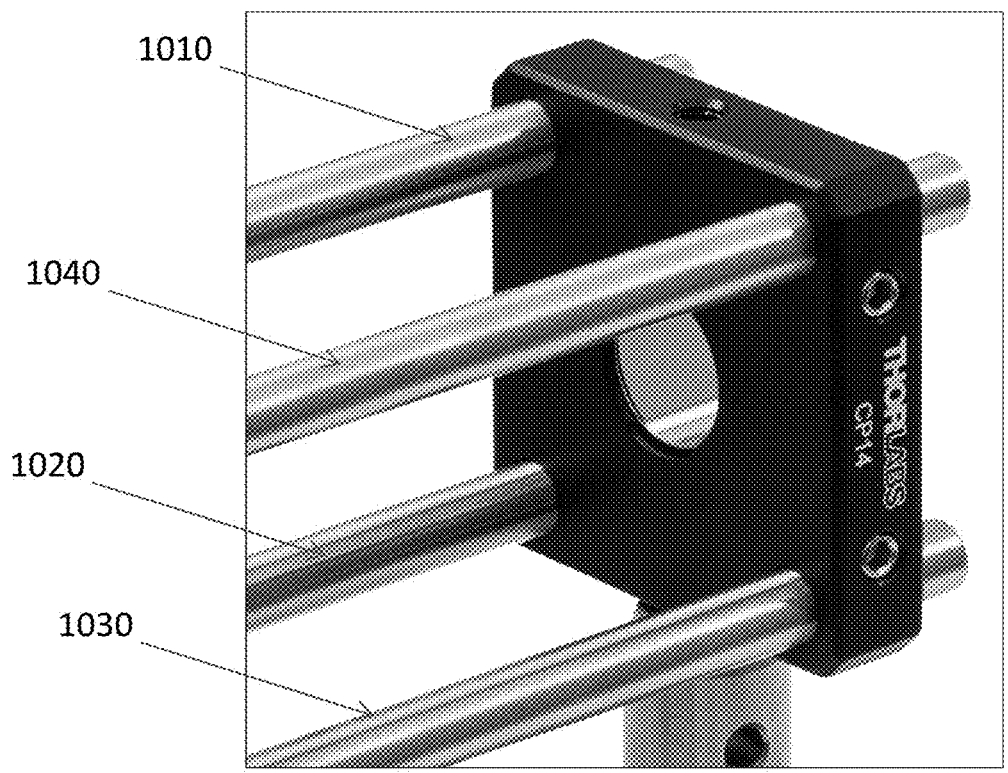
FIG. 10 is a pre-aligned optical mount with rods inserted according to an embodiment of the invention.

In another embodiment, as shown in FIG. 9, the desired part 900 may be machined to have a plurality of holes in the housing. The plurality of holes are positioned and sized to fit the corresponding rods of an arrangement of parallel rods. As shown in FIG. 10, when the plurality of parallel rods are inserted into the respective plurality of holes in the housing, the optical axis of the optical element 950 is aligned with a predefined optical axis with respect to the arrangement.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method of making a pre-aligned optical mount, comprising:
   mounting a desired optical element onto a housing;
   securing the housing onto a stage having at least four degrees of freedom;
   aligning the optical element with a specified optical axis by adjustment of the stage;
   machining the housing to match an optical platform onto which the housing is be mounted;
   wherein the housing is machined such that an optical axis of the optical element mounted onto the housing is aligned with a predefined optical axis with respect to the optical platform when the housing is mounted onto the optical platform; and
   wherein the aligning the optical element with the specified optical axis comprises directing a light beam to the optical element, and performing at least one of:
   adjusting the stage in the Z- and Y-directions until a transmitted beam on a 2D lateral sensor is overlaid with its home position;
   adjusting pitch and yaw of the platform until a reflected fringe pattern is overlaid with its home position upon a camera.

2. The method of claim 1, wherein the aligning the optical element with the specified optical axis is performed iteratively until an acceptable alignment is achieved.

3. The method of claim 1, further comprising using a touch probe for aligning the optical element in the X-direction.

4. The method of claim 1, wherein the optical platform is an optical table having a first and second locating pins, first ends of the first and second locating pins being inserted into holes of the optical table at specified locations, and wherein the machining of the housing comprises:
   machining a contact surface on the housing;
   drilling a first and second holes on the contact surface;
   wherein the contact surface is machined with respect to a desired plane, and the first and second holes are positioned and sized to fit the corresponding first and second locating pins on the optical table, such that the optical axis of the optical element is aligned with the predefined optical axis with respect to the optical table when the contact surface makes contact with the optical table with second ends of the first and second locating pins inserted into the first and second holes respectively.

5. The method of claim 1, wherein the optical platform is an optical table comprising a slot, and wherein the machining of the housing comprises:
   machining the housing to form a contact surface and a protrusion from the contact surface;
   wherein the contact surface is machined with respect to a desired plane, the protrusion is sized to fit the corresponding slot in the optical table in a specific orientation, such that the optical axis of the optical element is aligned with the predefined optical axis with respect to the optical table when the contact surface makes contact with the optical table with protrusion inserted into the slot of the optical table.

6. The method of claim 1, wherein the optical platform is an optical table comprising a channel, and wherein the machining of the housing comprises:
   machining the housing to form a contact surface and a protrusion from the contact surface;
   wherein the contact surface is machined with respect to a desired plane, the protrusion is sized to fit the corresponding channel in the optical table in a specific orientation, such that the optical axis of the optical element is aligned with the predefined optical axis with respect to the optical table when the contact surface makes contact with the optical table with protrusion slid into the channel of the optical table.

7. The method of claim 1, wherein the optical platform is an arrangement of a plurality of parallel rods, and wherein the machining of the housing comprises:
   drilling a plurality of holes in the housing;
   wherein the plurality of holes are positioned and sized to fit the corresponding rods of the optical platform, such that the optical axis of the optical element is aligned with the predefined optical axis with respect to the optical platform when the plurality of parallel rods are inserted into the respective plurality of holes in the housing.

* * * * *